(12) United States Patent
Oberaigner

(10) Patent No.: US 8,795,124 B2
(45) Date of Patent: Aug. 5, 2014

(54) TRANSFER GEAR-BOX

(76) Inventor: Paul Roman Oberaigner, Berg bei Rohrbach (AT)

( * ) Notice: Subject to any disclaimer, the term of this patent is extended or adjusted under 35 U.S.C. 154(b) by 0 days.

(21) Appl. No.: 13/636,856

(22) PCT Filed: Jun. 3, 2011

(86) PCT No.: PCT/AT2011/000250
§ 371 (c)(1),
(2), (4) Date: Sep. 24, 2012

(87) PCT Pub. No.: WO2011/160144
PCT Pub. Date: Dec. 29, 2011

(65) Prior Publication Data
US 2013/0012352 A1    Jan. 10, 2013

(30) Foreign Application Priority Data
Jun. 25, 2010 (AT) ................. A 1081/2010

(51) Int. Cl.
*F16H 37/08* (2006.01)
*B60K 17/346* (2006.01)

(52) U.S. Cl.
CPC .................. *B60K 17/3467* (2013.01)
USPC ....................................... 475/204

(58) Field of Classification Search
CPC .. B60K 17/346; B60K 17/342; B60K 17/344; B60K 17/3467
USPC ................................. 475/204, 206
See application file for complete search history.

(56) References Cited

U.S. PATENT DOCUMENTS

| | | | | |
|---|---|---|---|---|
| 4,722,246 A | * | 2/1988 | Gaus et al. | 475/249 |
| 4,805,484 A | * | 2/1989 | Hiraiwa | 74/665 T |
| 6,398,688 B2 | * | 6/2002 | Brown et al. | 475/204 |
| 6,612,957 B2 | * | 9/2003 | Bansbach et al. | 475/204 |
| 6,821,227 B2 | * | 11/2004 | Williams | 475/204 |
| 6,878,088 B2 | * | 4/2005 | Williams | 475/303 |
| 7,326,144 B2 | * | 2/2008 | Wheals | 475/205 |
| 2007/0049451 A1 | | 3/2007 | Mizon et al. | |
| 2007/0180940 A1 | | 8/2007 | Mizon et al. | |

FOREIGN PATENT DOCUMENTS

| | | |
|---|---|---|
| WO | 02/42106 A1 | 3/2002 |
| WO | 2009/069255 A1 | 6/2009 |

OTHER PUBLICATIONS

International Search Report mailed on Oct. 18, 2011 for PCT Patent Application No. PCT/AT2011/000250, 4 pages.

\* cited by examiner

*Primary Examiner* — Dirk Wright
(74) *Attorney, Agent, or Firm* — Kilpatrick Townsend & Stockton LLP

(57) ABSTRACT

The present invention relates to a transfer gear-box having a casing, an input shaft, a rear output shaft, a front output shaft, and two planet gear sets,
    the rear output shaft being arranged co-axially to the input shaft,
    the front output shaft being offset in relation to the input shaft,
    the two planet gear sets being arranged co-axially to the input shaft,
    the first planet gear set being a simple planet gear set and consisting of a ring gear, a sun wheel, a planet carrier, and several planet wheels, which are rotatably mounted to the planet carrier,
    the second planet gear set being a simple planet gear set and consisting of a ring gear, a sun wheel, a planet carrier, and several planet wheels, which are rotatably mounted to the planet carrier.

19 Claims, 10 Drawing Sheets

TRANSFER GEAR-BOX

This application is a U.S. National Phase under 35 USC 371 of PCT Application No. PCT/AT2011/000250 filed Jun. 3, 2011, which claims priority to the Austrian Application No. 1081/2010, filed Jun. 25, 2010, the disclosures of which are incorporated by reference herein.

The present invention relates to a transfer gear-box, particularly a two-speed transfer gear-box of the so-called single-offset type.

Such gear-boxes are normally directly flanged to a longitudinally arranged main gear-box and have one input shaft and two output shafts, one output shaft being arranged co-axially to the input shaft and the other output shaft being offset. Normally, the output shaft is offset in relation to the front axle in order to be able to guide the front propeller shaft past the vehicle's gear and/or the engine to the front axle gear.

Transfer gear-boxes essentially have two functions. They distribute the torque at a reasonable ratio to the drive axles and, if necessary, different transmission ratios are provided. Normally, the transmissions include a direct gear (transmission ratio of 1.0) and a cross-country gear providing for a transmission reducing the speed.

In cross-country vehicles and light-weight utility vehicles, favorable values for the cross-country reducing gear range between 2.0 and 2.5. Even lower gear reduction ratios may affect the cross-country mobility of the vehicle. Higher values are only advantageous under extreme cross-country conditions and/or in case of communal machines. It is advantageous to allow for changing between the road and the cross-country gear also during driving. As the reduced rotary inertias of the shaft of the synchronizer ring essentially increase quadratically in relation to the progressive ratio, very high cross-country reducing gear ratios cannot be synchronized without undergoing unacceptable efforts.

Common transfer gear-boxes mostly use a simple planet wheel set for generating the cross-country reducing gear, the choice of the transmission ratio being limited by constructive considerations. The diameters of the planet wheels cannot be reduced at will, as it would not be possible to reasonably bear them and the RPM of the bearing would increase dramatically. Moreover, the loading capacity of the planet gear is limited, if the planet wheel diameters are very small, as the force acting on the tooth faces increases dramatically. The diameter of the sun wheel may not be arbitrarily small, as often other shafts have to be inserted through the sun wheel. A characteristic consists in the stationary gear ratio which, for a simple planet gear, may be determined based on the ratio of the number of teeth of the ring gear and the sun wheel, and, in case of a balanced construction, normally ranges between −1.75 (in case of small-diameter planet wheels) and −5.0 (in case of a small-diameter sun wheel). These values will be used as constructive limits for the transmission and torque distribution for the examples below.

If the ring gear is driven (the sun wheel being locked), cross-country reducing ratios ranging between 1.2 and 1.57 may be achieved, which may not be sufficient for cross-country use. In case of balanced constructions, it is, however, not possible to achieve higher cross-country reducing ratios, as the diameters of the planet wheels would become too small.

If the sun wheel is driven (the ring gear being locked), cross-country reducing ratios ranging between 2.75 and 6.0 may be achieved. The cross-country reducing ratio is, thus, higher than desired. In case of balanced constructions, it is, however, not possible to achieve lower cross-country reducing ratios, as the diameters of the planet wheels would become too small. In practice, cross-country reducing ratios of approximately 2.6 are implemented, in spite of economic and constructive disadvantages.

In view of the efficiency of the transfer gear-box, there should not be any off-load rotating teeth in the road gear, as they cause additional losses due to inertia and reduce the gear's efficiency. Permanently rotating toothed wheels also require to be helical for reasons of noise comfort, which requires additional efforts for bearing the axial forces and, thus, causes an increase in manufacturing costs.

Moreover, the transfer gear-box should distribute the torque to the two axles at a reasonable ratio. The distribution may be achieved by means of at least one differential gear and/or a clutch. If a differential gear is used for distributing the torque, the torques are distributed to the front and rear axles at a certain ratio. The distribution is selected particularly based on traction and performance. In order to achieve an optimal traction, the distribution of the torque of the vehicle should be based on the dynamic axle loads. The dynamic axle loads essentially depend on the load condition of the vehicle, the acceleration, and the slope of the road; the choice of the way in which the torque is distributed is, thus, always some form of compromise.

In all-wheel drive cross-country vehicles and light-weight utility vehicles having a front engine, the torque is distributed at a ratio from 50:50 to 30:70 between the front and the rear axles. A symmetric distribution of the torque at a ratio of 50:50 between the front and the rear axles is advantageously achieved by a bevel differential gear. It is unusual to use of bevel differential gears for an asymmetric distribution of the torque. In case of a balanced design, a simple planet wheel set may be used to achieve asymmetric distributions, the share of the front axle amounting to 16.7 to 36.3%. It is difficult to achieve an even higher front axle share, as the diameters of the planet wheels would become too small. A distribution with a front axle share of about 40 to 45% is often advantageous, however. In order to close the gap between the torque distributions which may be achieved by a bevel differential gear and those which may be achieved by means of a planet wheel set, more complex planet gears are used, for example including meshed paired planet wheels or step planet wheels. The distribution may, for example, be achieved by a double planet wheel set (DE19538661C, for example). Another solution, which is mainly known from locking differentials, consists in the use of two sun gears and planet wheel pairs (WO002002065000A2, for example).

From WO002002008006A1, a transfer gear-box in which the cross-country reducing gear is formed by step planet wheels is known. The manufacturing of step planet wheels is cumbersome, as it is usually not possible to obtain smaller gearings by means of gear hobbing. Usually, three or more planet wheels are implemented in order to obtain a high torque density. In order to be able to mount several step planet wheels correctly, marks for the assembly have to be applied onto the planet wheels. It is, thus, very difficult to implement an automated, highly productive way of manufacturing and assembling the gears.

It may be advantageous to position the driving wheel further at the front of the front axle. From WO001999001310A1 a transfer gear-box in which the reducing gear and the differential gear form a unit located behind the driving wheel is known. Asymmetric torque distributions can be achieved by means of this transfer gear box which includes two sun wheels and planet wheel pairs; this, however, leads to a more complex construction, an increase of the length of the transfer gear box and of the number of components. It is not possible to achieve a balanced cross-country gear reduction which is significantly lower than 2.75; moreover, the teeth of the reducing gear also seesaw during use. A locking coupling for the differential is not provided.

In a further development of WO001999001310A1, known from EP000001254326B1, the teeth are prevented from seesawing by connecting the ring gear and the planet carrier. The torque is however, transmitted via running gears of the reducing gear, so that, in the road gear, tooth forces are higher in case of stresses caused by maloperation than if the gear reduction is engaged. The problems explained in detail in U.S. Pat. No. 4,569,252 are disadvantageous for dimensioning the gearing. By means of a friction clutch between the planet carrier and the front driving wheel, the longitudinal differential may be locked. If the torque is re-distributed to the rear axle, this re-distribution is achieved by means of the gearing of the longitudinal differential which are exposed to high stresses. The high stress exerted on the gearing constitutes an obstacle to achieving the aim of a compact, cost-efficient embodiment having a high torque density. The high cross-country gear reduction requires a high degree of synchronization; moreover, an asymmetric distribution of the torque may only be achieved at a higher number of components and, thus, requires increased efforts.

From DE19538661C, a transfer gear-box in which the cross-country gear reduction includes a double planet wheel set is known. The longitudinal differential also includes a double planet wheel. The small distance between the axes of the two meshed planet wheel pairs leads to a high pressure on the tooth faces. Because of the meshed planet wheel pairs each other, it is only possible to mount a few planet wheels at the circumference, which additionally limits the torque density. The provided coupling prevents the planet wheels from hobbing in the road gar, but also results in strong forces acting on the teeth. By means of said double planet wheel gear, it is possible to achieve a gear reduction of 2.0 to 2.5, for example, without any problems. The gearing efficiency is lower than with a single planet wheel set, which may result in an increased consumption and higher heat losses.

The aim of the invention consists in providing a compact, fail-safe and cost-efficient two-speed transfer gear-box with an offset drive, said gear-box achieving a gear reduction of approximately 2.0 to 2.6 in case of a balanced construction and being capable of distributing the torque to the front and rear axles at a ratio from approximately 45:55 to 38:62.

In a transfer gear-box of the initially described type, these aims are achieved by means of the characteristics described in claim 1.

The claims 2 and 3 relate to specific embodiments of the power transmission to the offset drive.

The claims 4, 5, and 6 are advantageous. They provide the transfer gear-box with additional functionalities.

Claim 7 relates to a particularly cost-efficient embodiment of the transfer gear box, providing for a high number of like parts and a low diversity of different components.

The claims 8 to 13 relate to six different types of arranging the gear-box elements in the casing of the transfer gear-box of the invention.

Claim 14 relates to the way in which the reduction gear is engaged.

Claim 15 relates to a variety of the transfer gear-box in which the all-wheel drive may also be switched off.

It is noted that "front" refers to that side of the transfer gear-box which is closer to the input shaft, while "rear" refers to that side which is remote from the input shaft.

The aim of the invention is achieved by using two single planet wheel sets coupled to one another. These two planet wheel sets may be implemented using a lot of like parts; they may particularly have identical gearings. In the embodiment of the transfer gear-box of the invention, there is no longer a complete functional separation of the reduction gear and the longitudinal differential; the two planet wheel sets rather form a combined differential/reduction unit. If the two planet wheel sets in the transfer gear-box of the invention have the same gearings and the same number of planet wheels, the tooth forces in the two planet wheel sets are identical. This means that the cost advantage of using like parts is additionally combined with a balanced dimensioning.

The input shaft acts on an internal ring gear of the first planet gear set. The ring gear is meshed with several planet wheels which are rotatably mounted to the planet carrier. The planet carrier is connected to the rear axle by the drive shaft.

The sun wheel of the first planet wheel set is linked to the sun gear of the second planet wheel set. Advantageously, the two sun gears are made from the same blank. In view of the manufacturing costs, it may be advantageous to provide the two gears with gearings having the same gearing data, so that they may be manufactured in a single step using the same gear-cutting tool.

The second sun wheel is meshed with planet wheels which are rotatably mounted to the planet carrier of the second planet wheel set. These planet sheels are meshed with the second ring gear which is connected to the front axle via the drive wheel. The front axle may be driven by an embodiment of the drive known to those skilled in the art, particularly by means of a set of spur gears or by a sprocket chain gear. It is also possible to use conical spur gears (particularly beveloid gears) as offset gear.

The planet carrier of the second planet wheel set may be coupled to the gear-box casing or to the input shaft or to the ring gear driven by said input shaft, or it may assume a neutral position. In addition, if the planet carrier is adequately constructed, it is possible to couple it to both the gear-box casing and the ring gear and, thus, obtain a parking break. Those of skill in the art may use known embodiments for the gearing and the configuration of the gearshift assembly. The internal gearing of the ring wheel may also be used as shift gearing. The gears may be shifted automatically or manually. The shifting of the gears may be actuated by an electric motor, hydraulically or pneumatically, and may be initiated by the driver by means of an actuating element. The shifting of the gears may also be synchronized. If the planet carrier of the second planet wheel set is coupled to the input shaft, the transfer gear transmission amounts to 1.0 (which corresponds to the road gear). If the planet carrier of the second planet wheel set is coupled to the casing, the gear is reduced (which is the cross-country gear). The cross-country gear reduction $i_{Low}$ may be determined by means of the following formula:

$$i_{Low} = \frac{i_{P1} + i_{P2} - 1}{i_{P1}}$$

Here, $i_{P1}$ refers to the stationary gear ratio of the first planet wheel set, while $i_{P2}$ refers to that of the second planet wheel set. If those stationary gear ratios are the same ($i_{P1}=i_{P2}$) and the following limits apply: $-1.75 \geq i_{P1} = i_{P2} \geq -5$, a cross-country gear reduction of $2.2 \leq i_{Low} \leq 2.57$ may be achieved. The representable area of the cross-country gear reduction may be further increased by using different embodiments for the two planet wheel sets. Compared to known, conventionally configured transfer gear-boxes with a similar cross-country gear reduction, the tooth forces are significantly lower, as the entire input torque is not transferred to the sun wheel, but to a significantly larger diameter (of the ring gear). This results in a reliable, light-weight, and compact transfer gear-box.

If the front-axle torque $T_{VA}$ is related to the overall torque $T_{Ges}$ (being the sum of the front-axle torque $T_{VA}$ and the rear-axle torque $T_{HA}$), the front axle ratio (without taking friction into consideration) may be determined according to the following formula:

$$\frac{T_{VA}}{T_{Ges}} = \frac{i_{P2}}{i_{P1} + i_{P2} - 1}$$

Here, $i_{P1}$ refers to the stationary gear ratio of the first planet wheel set, while $i_{P2}$ refers to that of the second planet wheel set. If those stationary gear ratios are the same ($i_{P1}=i_{P2}$) and the following limits apply: $-1.75 \geq i_{P1} = i_{P2} \geq -5$, a front axle ratio between 38.9% and 45.5% may be achieved.

The torque distribution does not depend on whether the road gear or the cross-country gear is engaged. The front axle ratio always lies in an area which is reasonable for both cross-country vehicles and light-weight utility vehicles.

In order to achieve a better traction, the speed compensation between the front axle and the rear axle may be lockable, so that the speed compensation between the axles may be adequately impeded. The lock acts between the rear drive shaft and the driving wheel, so that it does not result in an increase of the forces acting on the gearing in the planet gears. The lock may particularly be a fluid friction clutch, a friction clutch, or a claw clutch. The friction clutch may be a spring-biased multi-disc clutch and/or be actuated electrically, preferably by an electric motor or hydraulically, and may advantageously have different degrees of action. The friction clutch may be part of a vehicle dynamics control system.

It may be advantageous to allow for the drive of the offset axle to be switched off. By completely shutting down one partial drive line, the efficiency of the drive line may be increased. If necessary, the all-wheel drive can be switched on. Such a two-wheel drive mode may be implemented in the transfer gear-box of the invention by de-coupling the upper driving wheel via a clutch and engaging the lock at the same time.

Below, the invention will be described in further detail referring to illustrations. The FIGS. 1 to 6 schematically show different embodiments of the transfer gear-box.

The FIGS. 7a, 7b, 8a, and 8b exemplarily illustrate the functioning of the transfer gear-box based on RPM and torque data.

Figure 9:
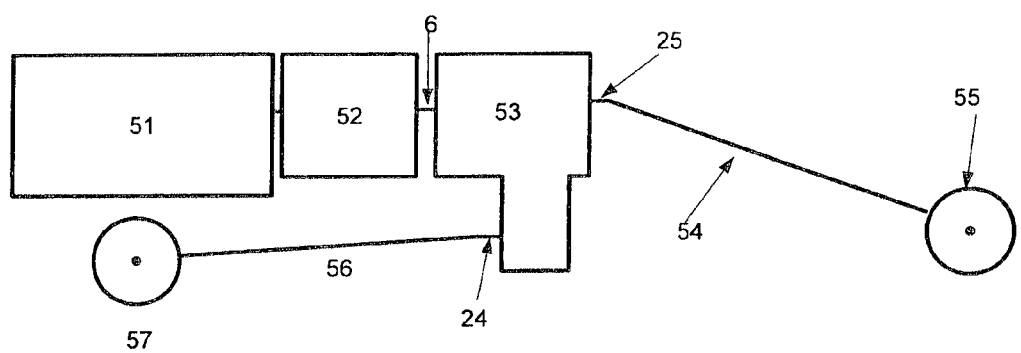
FIG. 9 shows the configuration of the vehicle drive line in which the transfer gear-box of the invention is to be included.

FIG. 9 shows a possible configuration of a drive line in which the engine (51) is a longitudinally mounted front engine and the vehicle, particularly a motor vehicle, has a all-wheel drive. The transfer gear-box (53) of the invention may be used alone or in combination with any drive, in order to distribute a torque between at least two axles (55, 57). In case of a vehicle having three axles, it may, for example, also serve to distribute the torque between the first and the other axles. The torque of drive shafts of an electric motor may also be distributed. The transfer gear-box of the invention may basically also be used in stationary machines in which a torque is to be distributed according to the invention.

A gear set (52) is coupled to the engine (51) (a combustion engine, electric motor, for example), the transfer gear-box (53) of the invention being coupled to said gear set (52). The transfer gear-box (53) may also be directly coupled to the engine (51). The transfer gear-box (52) of the invention doubles the number of available gears as well as the number of the different torques obtainable by means of the gear set (52) and the engine (51).

The transfer gear-box of the invention has an input shaft (6), a rear output shaft (25), arranged co-axially in relation to said input shaft (6), and an offset front output shaft (24). The central axis of the front output shaft (24) may particularly be parallel to the central axis of the input shaft (6); they may, however, also cross each other or arranged in a skew relation to one another.

The rear output shaft (25) of the transfer gear-box (51) of the invention normally drives at least one axle (55), particularly the rear axle, normally via a cardan shaft (54), said axle (55) being connected to said cardan shaft (54) in a way that allows for the transmission of force. The transfer gear-box (53) also drives another axle (57), particularly a front axle, which is connected to the front output shaft (24) of the transfer gear-box (53) of the invention by means of a cardan shaft or a synchronized propeller shaft (56).

FIGS. 1 to 6 schematically show different embodiments of the transfer gear-box of the invention. The transfer gear-box has an input shaft (6), a co-axial rear output shaft (25), two planet wheel sets (P1, P2) arranged co-axially to said input shaft (6), and an offset front output shaft (24), which is driven by means of an offset gear set (V), preferably by a set of spur gears (21, 22, 23) or by a sprocket chain gear (21b, 22b, 23b).

Depending on how the planet wheel sets (P1, P2) are arranged in relation to the offset gear set (V), particularly to the set of spur gears (21, 22, 23) or the sprocket chain gear (21b, 22b, 23b), there are six possible embodiments. The embodiments illustrated by the FIGS. 1 to 6 have identical gear set elements, coupled to one another in the same way, being cinematically equivalent to one another, and primarily differing from one another in the way in which the individual elements are arranged within the casing (5). Which of the possible embodiments is most advantageous also depends on the respective vehicle. Depending on the available construction space it may be better to position the front drive shaft (24) further at the front or further at the back.

The first planet wheel set (P1) consists of a ring gear (2), the planet carrier (4), the sun gear (1) and several planet wheels (3).

The second wheel set (P2) consists of a ring gear (12), the planet carrier (14), the sun gear (11) and several planet wheels (13).

The input shaft (6) is coupled to the ring gear (2) in order to be able to drive the same. The ring gear (2) is meshed with several planet wheels (3), which are rotatably mounted to the planet carrier (4). The planet wheels (3) additionally mesh with the sun gear (1). The planet carrier (4) is drivably coupled to the rear output shaft (25).

The sun gear (1) is coupled to another sun gear (11), or the two sun gears (1, 11) are formed integrally. The sun gear (11) is meshed with several planet wheels (13), which are rotatably mounted to the planet carrier (14). The planet wheels (13) are additionally meshed with the ring gear (12). The ring gear (12) may be directly coupled to the driving wheel (21) or via an intermediate shaft (16). The planet carrier (14) may be drivably coupled either to the input shaft (6) via the interconnection (17), preferably a translatable shift collar, (road gear H) or assume a neutral position (position N), or be drivably coupled to the casing (5) of the transfer gear-box (cross-country gear L).

Figure 1:
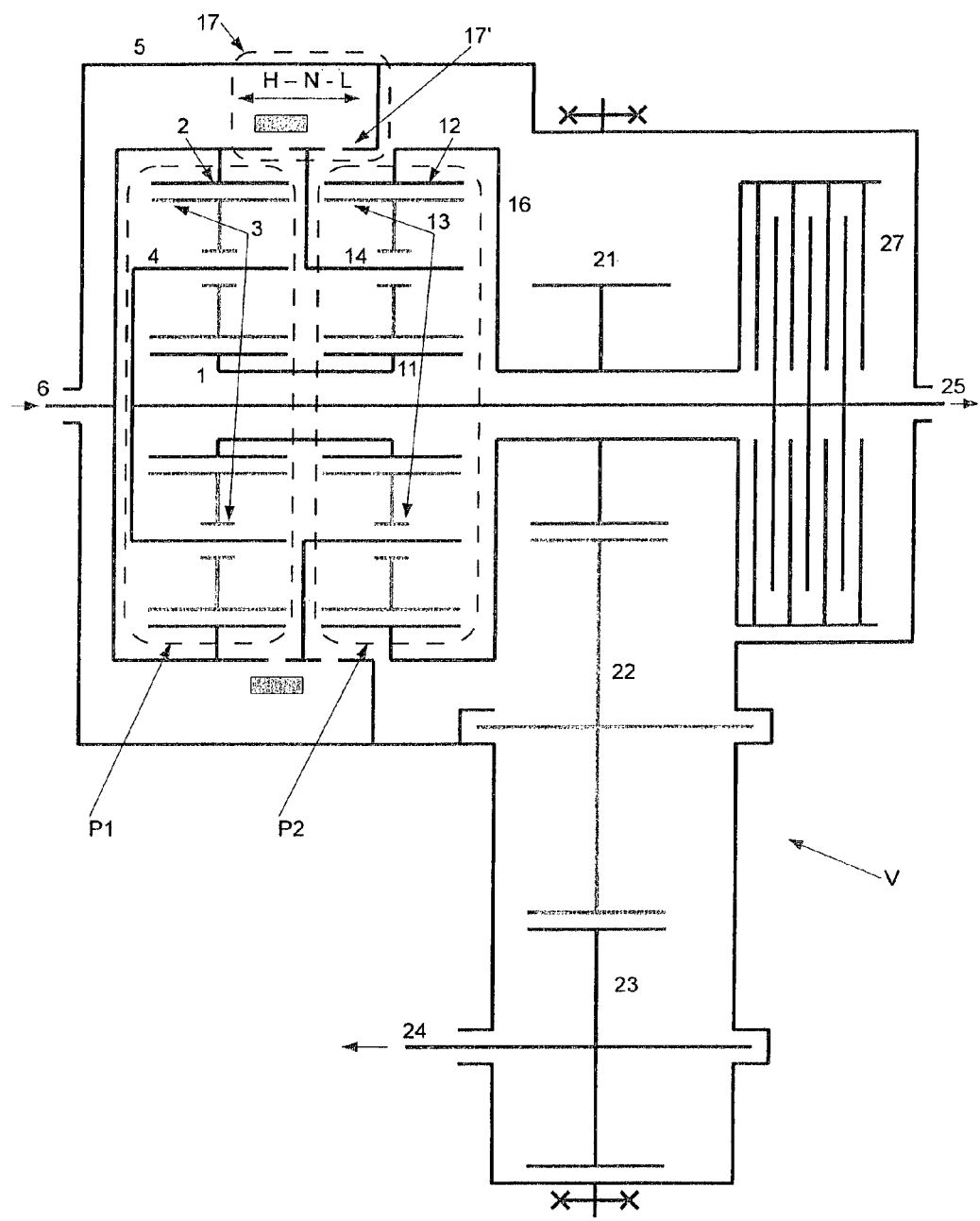
Figure 2:
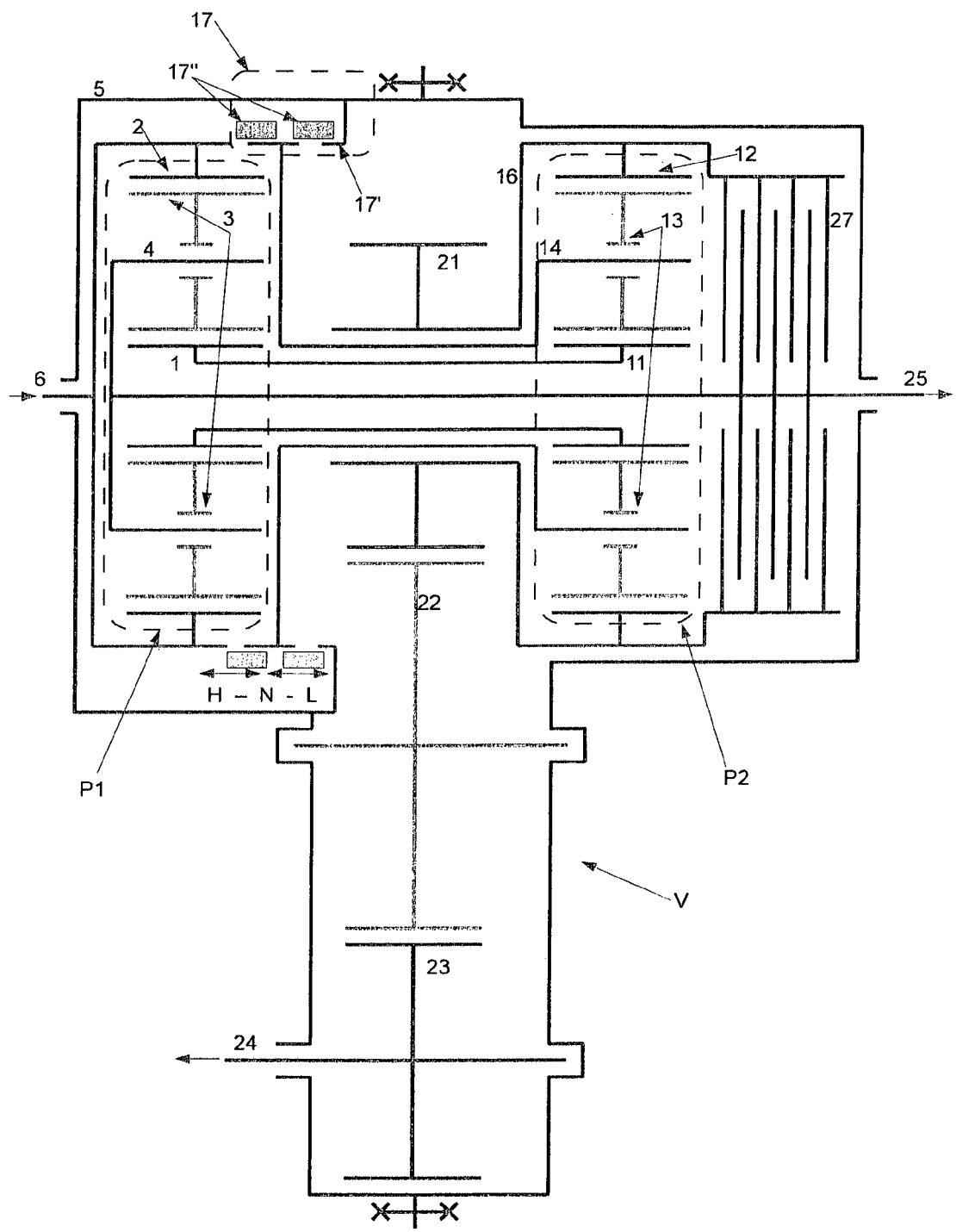

This interconnection (17) may be implemented in different ways. It is, for example, possible to use shift couplings. Preferably, a translatable collar, as illustrated in FIG. 1, is used. This translatable collar is slidably mounted to the planet carrier (14) and to the ring gear (2) as well as to a coupling (17') to the casing in the form of a shift collar. In a neutral position in which the shift collar is shifted to contact the ring gear (2), the planet carrier (14) and the coupling (17') to the casing remain free. If the shift collar is shifted into a position H, the ring gear (2) is coupled to the planet carrier (14). If the shift collar (17) is further shifted into the position N, a neutral position is achieved in which the planet carrier (14) and the ring gear (2) and the coupling (17') to the casing remain uncoupled and free. If the shift collar (17) is shifted further to the right into the position L, the planet carrier (14) is coupled to the coupling (17') to the casing (5). It may be provided that the shift collar (17) may be shifted further towards the coupling (17'), so that a neutral position is reached. Similarly, it may be coupled to two separate shift couplings (17"), as illustrated in FIG. 2. Each of the two illustrated couplings (17") may be shifted into a release position or into a coupling position. In its engaging position, the coupling (17") shown on the left-hand side couples the ring gear (2) to the planet carrier (14). If both connections are released, a neutral position is achieved. If the right-hand coupling (17") is engaged, the planet carrier (14) is coupled to the coupling (17') to the casing (5). If both couplings (17") are engaged, the function of a parking break may be achieved.

Figure 3:
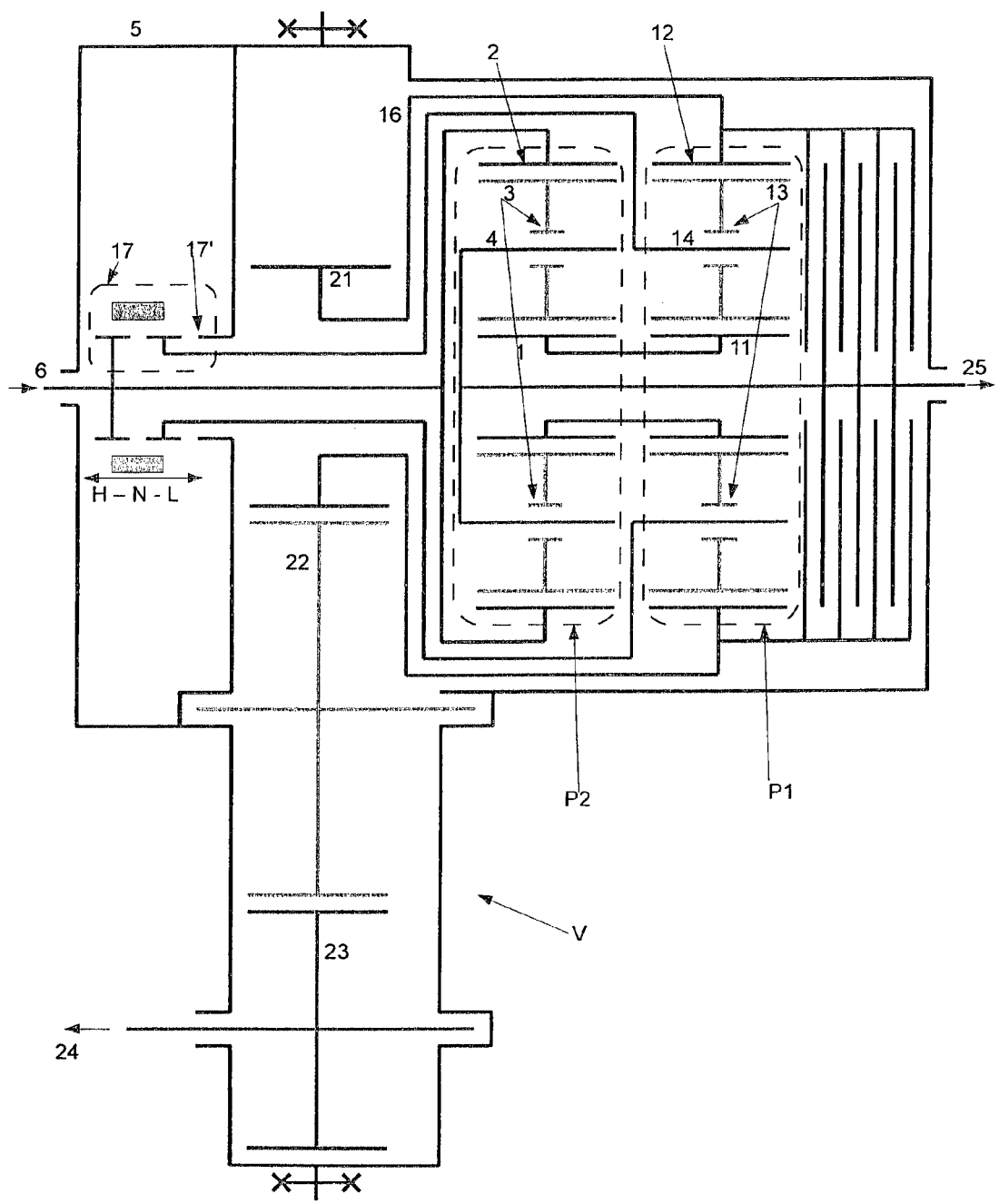

In the FIGS. 1, 2, and 3, the driving wheel (21) transfers the torque via two further gears (22, 23) to the front drive shaft (24). Alternatively, it is, of course, possible to implement the required axial offset between the front drive shaft (24) and the input shaft (6) by means of a sprocket chain gear, consisting of an upper chain wheel (21b), a sprocket chain (22b), and a lower chain wheel (23b), as illustrated in the FIGS. 4, 5, and 6.

The lock coupling (27) has two terminals, one terminal being connected to the output shaft (25), the other being connected to the driving wheel (21) or the upper chain wheel (21b) via the intermediate shaft (16).

In the embodiments shown in the FIGS. 1 to 6, the lock coupling (27) and the interconnection (17), which is preferably formed by a shift collar, may advantageously be actuated externally and directly, so that it is not necessary to pass an actuating medium, such as a pressurized oil, through the rotating shafts, which requires considerable effort.

In the transfer gear-box schematically illustrated in FIG. 1, the front output shaft (24) is situated far at the back and is driven by spur gears (21, 22, 23). The first planet wheel set (P1) is located in front of the second planet wheel set (P2), the driving wheel (21) being situated behind it. The first planet wheel set (P1) is located in front of the second planet wheel set (P2), the upper chain wheel (21b) or the upper driving gear (21) being located behind the second planet wheel set (P2), the front side of the planet carrier (4) being connected to the rear output shaft (25), the interconnected sun wheels (1, 11) being hollow bodies located on larger diameters than the rear output shaft (25), the intermediate shaft (16) being a hollow shaft located on a larger diameter than the rear output shaft (25), and the front side of the planet carrier (14) being interconnectable to the casing (5) or the ring gear (2) or assuming a neutral position. In the transfer gear-box illustrated in FIG. 1, the rear output shaft (25) is very long, which allows for support torques from the cardan shaft (54) to be introduced into the casing (5) over a wide support basis.

FIG. 2 schematically shows a second embodiment in which the front output shaft (24) is positioned at an intermediate position. It is provided that the first planet wheel set (P1) is located in front of the upper chain wheel (21b) or the driving gear (21), that the second planet wheel set (P2) is situated behind the upper chain wheel (21b) or the driving gear (21), that the front side of the planet carrier (4) is connected to the rear output shaft (25), that the interconnected sun wheels (1, 11) are hollow bodies located on larger diameters than the rear output shaft (25), that the front side of the planet carrier (14) is a hollow shaft located on a larger diameter than the sun wheels (1, 11) extending to the interconnection (17), that the intermediate shaft (16) is a hollow shaft having a larger diameter than the connection between the interconnection (17) and the planet carrier (14), and that the front side of the planet carrier (14) is connectable to the casing (5) and/or to the ring gear (2) or may assume a neutral position. Compared to FIG. 1, the internal arrangement of the components is changed, the connections and functions remaining the same, however. The front output shaft (24) is driven by an offset gear set consisting of spur gears (21, 22, 23). The first planet wheel set (P1) is located in front of the driving wheel (21), the second planet wheel set (P2) being located behind it.

FIG. 3 schematically shows a third embodiment in which the front output shaft (24) is positioned at the very front. It is provided that the upper chain wheel (21b) or the driving gear (21) is located in front of the first planet gear set (P1), that the second planet gear set (P2) is located behind the upper chain wheel (21b) or the driving wheel (21), that the front side of the planet carrier (4) is connected to the rear output shaft (25), that the interconnected sun wheels (1, 11) are hollow bodies located on a larger diameter than the rear output shaft (25), that the front side of the planet carrier (14) lies on a larger diameter, extending via the ring gear (2) and the input shaft (6) to the interconnection (17), that the intermediate shaft (16) is a hollow shaft located on a larger diameter than the coupling between the interconnection (17) and the planet carrier (14), and that the front side of the planet carrier (14) may be coupled to the casing (5) or to the ring gear (2) or may assume a neutral position. Compared to FIG. 1, the internal arrangement of the components is changed, the connections and functions remaining the same, however. The front output shaft (24) is driven by an offset gear set consisting of spur gears (21, 22, 23). The driving wheel (21) is located in front of the first planet gear set (P1), the second planet wheel set (P2) being located behind it.

Figure 4:
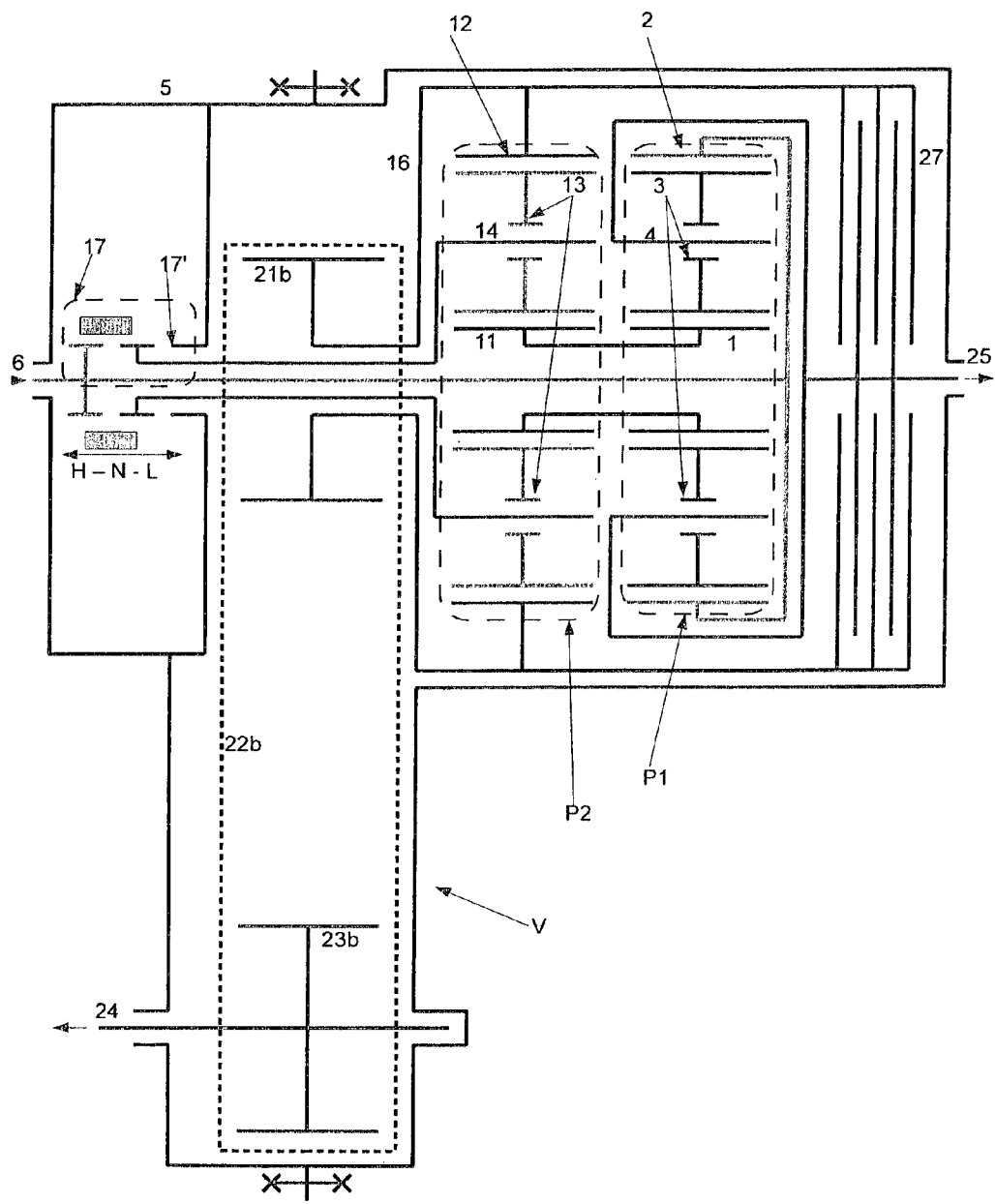

FIG. 4 schematically shows a fourth embodiment in which the front output shaft (24) is positioned at the very front. It is provided that the upper chain wheel (21b) or the driving gear (21) is located in front of the second planet gear set (P2), that the first planet gear set (P1) is located behind the second planet gear set (P2), that the interconnected sun wheels (1, 11) are hollow bodies located on a larger diameter than the input shaft (6), that the connection between the front side of the planet carrier (14) and the interconnection (17) is a hollow shaft located on a larger diameter than the input shaft (6), that the intermediate shaft (16) is a hollow shaft located on a larger diameter than the connection between the front side of the planet carrier (14) and the interconnection (17), that the front side of the planet carrier (4) is connected to the rear output shaft (25), and that the front side of the planet carrier (14) may be coupled to the casing (5) or to the ring gear (2) or may assume a neutral position. Compared to FIG. 1, the internal arrangement of the components is changed, the connections and functions remaining the same, however. The front output shaft (24) is driven by a sprocket chain drive, consisting of an upper chain wheel (21b), a sprocket chain (22b), and a lower chain wheel (23b). The upper chain wheel (21b) is located in front of the second planet gear set (P2), the first planet gear set (P1) being located behind it.

Figure 5:
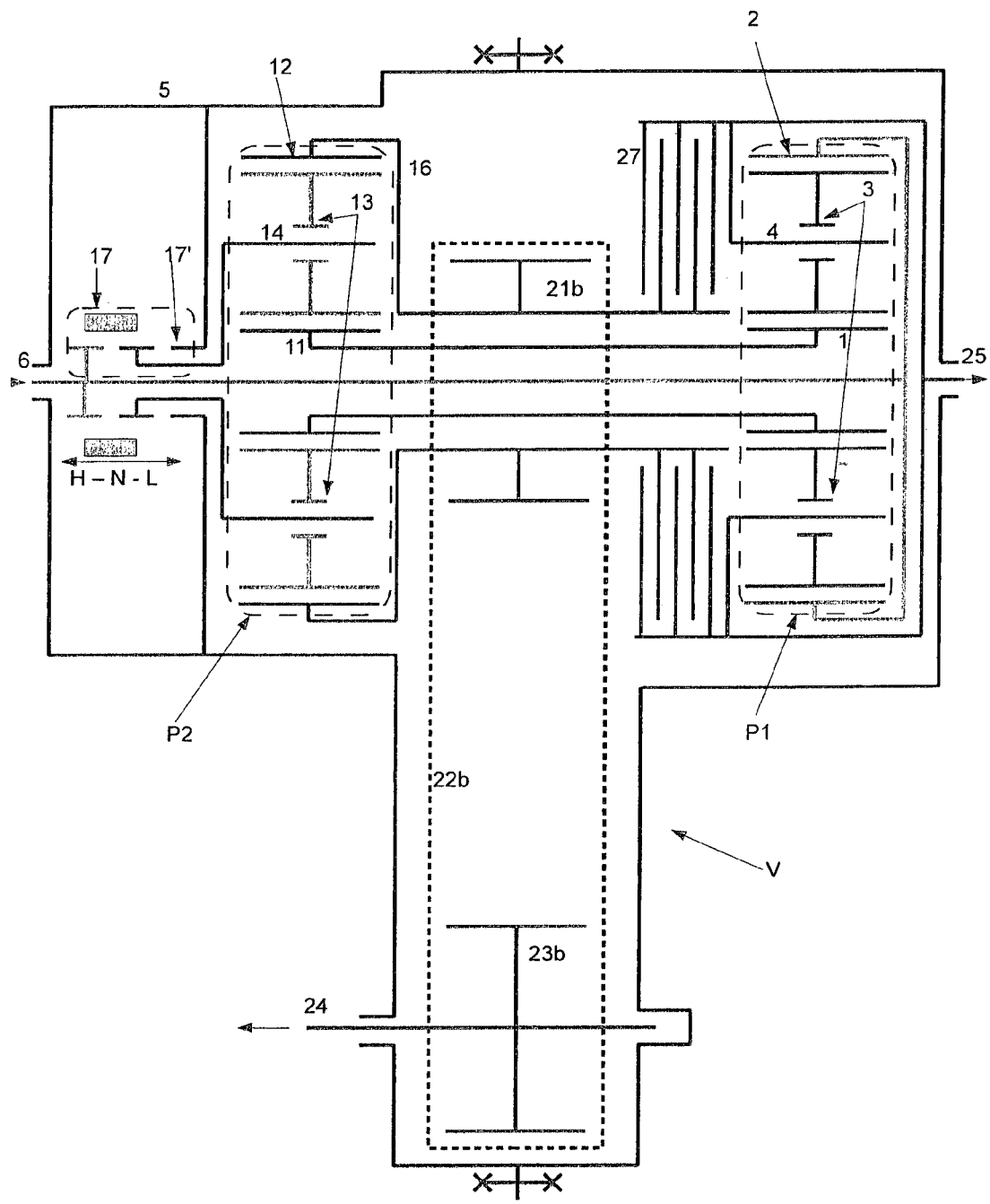

FIG. 5 schematically shows a fifth embodiment in which the front output shaft (24) is positioned at an intermediate position. It is provided that the second planet gear set (P2) is located in front of the upper chain wheel (21*b*) or the driving gear (21), that the first planet gear set (P1) is located behind the upper chain wheel (21*b*) or the driving wheel (21), that the interconnected sun wheels (1, 11) are hollow bodies located on a larger diameter than the input shaft (6), that the intermediate shaft (16) is a hollow shaft located on a larger diameter than the input shaft (6) and the sun wheels (1, 11), that the front side of the planet carrier (4) is connected to the rear output shaft (25), and that the front side of the planet carrier (14) may be coupled to the casing (5) or to the ring gear (2) or may assume a neutral position. Compared to FIG. 1, the internal arrangement of the components is changed, the connections and functions remaining the same, however. The front output shaft (24) is driven by a sprocket chain drive, consisting of an upper chain wheel (21*b*), a sprocket chain (22*b*), and a lower chain wheel (23*b*). The second planet gear set (P2) is located in front of the upper chain wheel (23*b*), the first planet gear set (P1) being located behind it.

Figure 6:
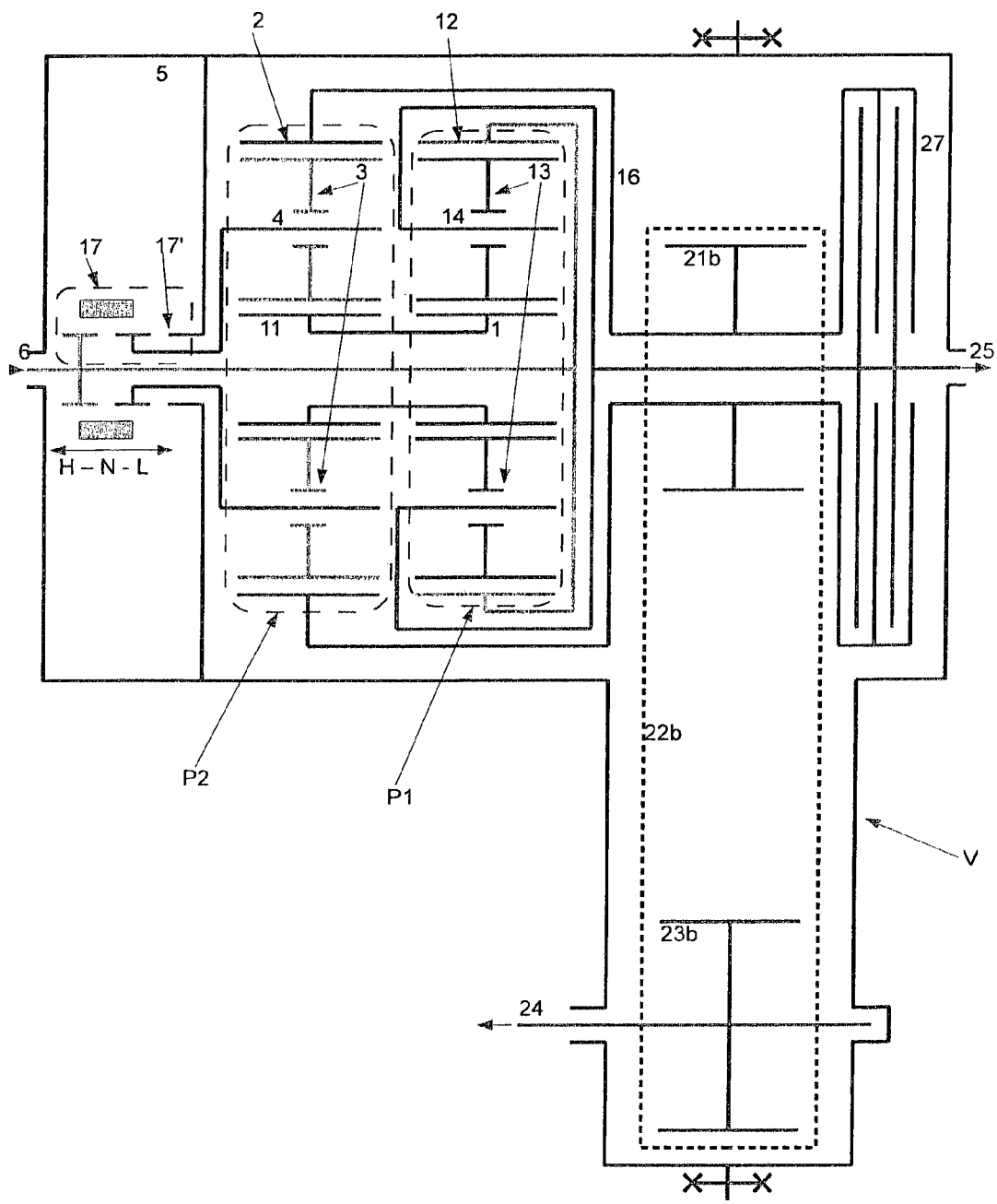

FIG. 6 schematically shows a sixth embodiment in which the front output shaft (24) is positioned at the very back. It is provided that the second planet gear set (P2) is located in front of the first planet gear set (P1), that the upper chain wheel (21*b*) or the driving gear (21) is located behind the first planet gear set (P1), that the interconnected sun wheels (1, 11) are hollow bodies located on a larger diameter than the input shaft (6), that the connection between the front side of the planet carrier (4) and the rear output shaft (25) is a hollow shaft having a larger diameter than the ring gear (2), that the front side of the planet carrier (4) is connected to the rear output shaft (25), and that the front side of the planet carrier (14) may be coupled to the casing (5) or to the ring gear (2) or may assume a neutral position. Compared to FIG. 1, the internal arrangement of the components is changed, the connections and functions remaining the same, however. The front output shaft (24) is driven by a sprocket chain drive, consisting of an upper chain wheel (21*b*), a sprocket chain (22*b*), and a lower chain wheel (23*b*). The second planet gear set (P2) is located in front of the first planet gear set (P1), the upper chain wheel (23*b*) being located behind it.

It is, of course, possible to implement the transfer gear-boxes illustrated in the FIGS. 1, 2, and 3 using a sprocket chain gear (21*b*, 22*b*, 23*b*) instead of the toothed gears (21, 22, 23). It is also possible to use toothed gears (21, 22, 23) instead of a sprocket chain gear (21*b*, 22*b*, 23*b*) in the embodiments illustrated in the FIGS. 4, 5, and 6.

It is also possible to implement the interconnection (17) of the transfer gear-box illustrated in FIG. 2 analogously to the FIGS. 1 and 3 to 6. The interconnection (17) according to FIG. 2 may, of course, also be used for the transfer gear-boxes according to the FIGS. 1 and 3 to 6.

The FIGS. 7*a*, 7*b*, 8*a*, 8*b* show exemplary RPM and torque values of transfer gear-boxes in different operation modes. It is assumed that the input torque amounts to 1,000 Nm, the input speed amounts to 100 RPM, the stationary gear ratio are $i_{P1}=i_{P2}=-2$, friction losses being neglected, absolute torque values being used.

Figure 7A:
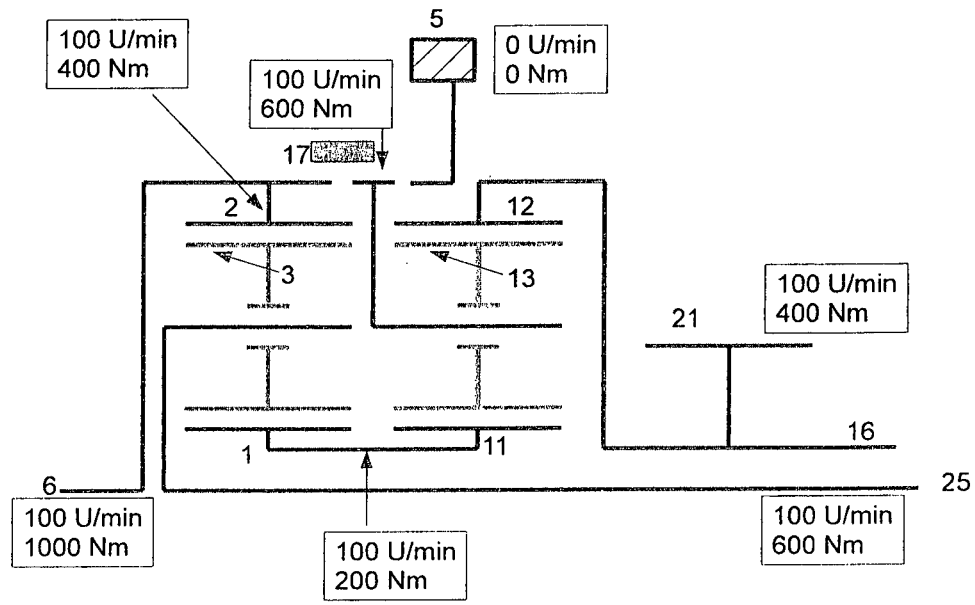
Figure 7B:
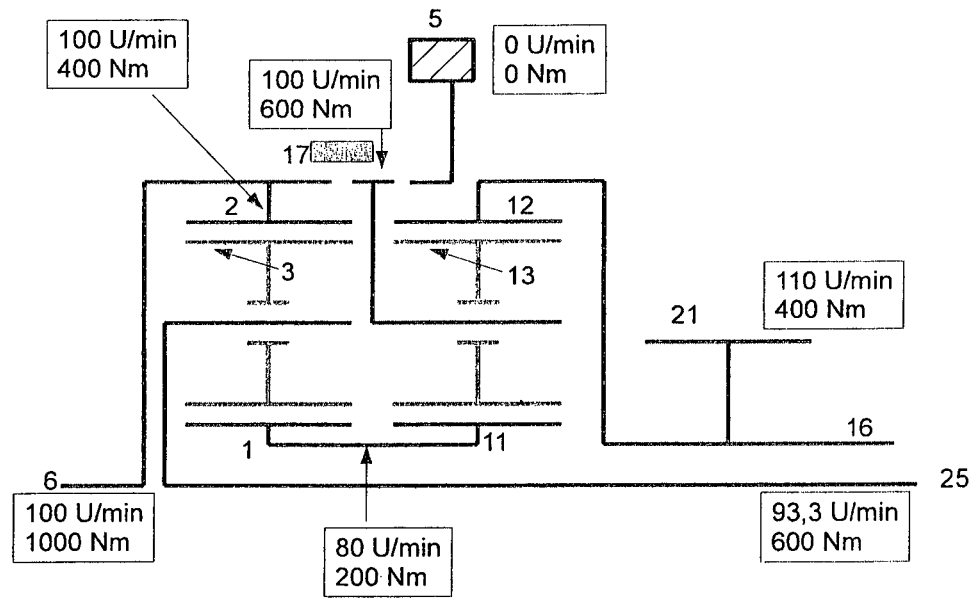

The FIGS. 7*a* and 7*b* show the transfer gear-box, the road gear being engaged. The torque initiated by the input shaft (6) is partly initiated via the ring gear (2) of the first planet gear set (P1) and is transferred via the shift collar (17) to the planet carrier of the second planet gear set (P2). Due to this arrangement, the tooth forces and the stress acting on the coupling (17), in particular on the shift collar, remains low.

FIG. 7*a* shows the transfer gear-box's operation in the road gear without a difference in the rotational speeds of the front axle and the rear axle. It can be seen that the gearings in the two planet gear sets (P1, P2) are not hobbed.

FIG. 7*b* shows the transfer gear-box's operation in the road gear, assuming an exemplary difference in the rotational speeds. The difference in the rotational speeds result in the hobbing of the gearings in the two planet gear sets (P1, P2).

Figure 8A:
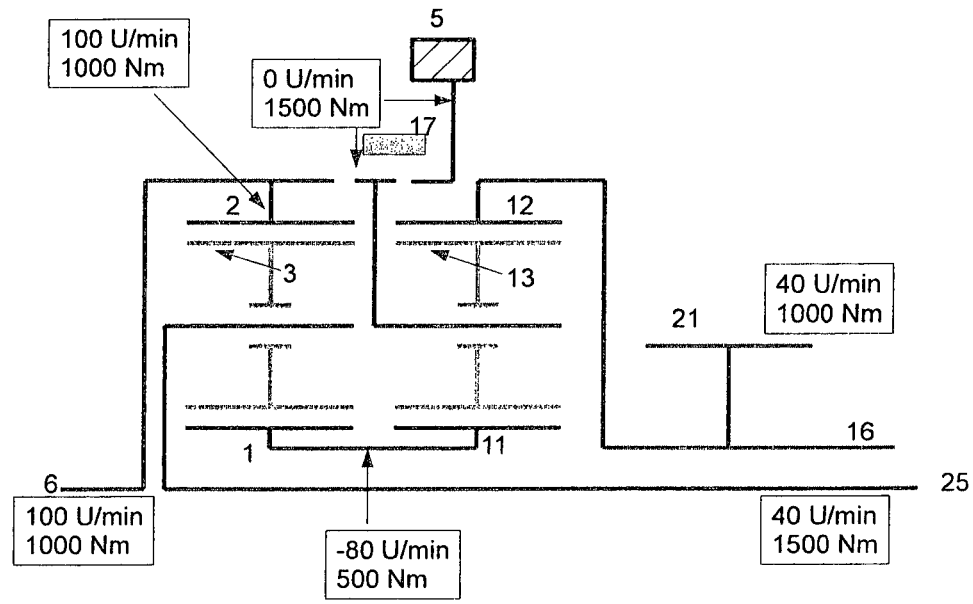
Figure 8B:
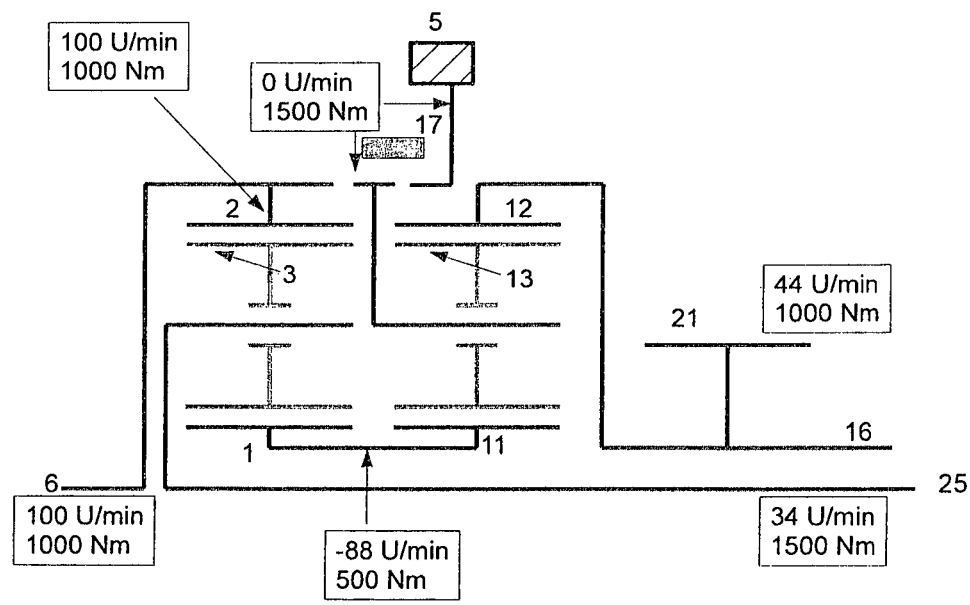

FIGS. 8*a* and 8*b* show the transfer gear-box, the cross-country gear being engaged. The torque initiated by the input shaft (6) is completely transferred to the ring gear (2) of the first planet gear set. The sun wheels (1, 11) turn against the direction of rotation of the input shaft (6). The second planet gear set (P2) converts the rotational speed and the torque of the sun wheels (1, 11) in a way that the drive moment of the ring gear (12) of the second planet gear set (P2) is increased compared to that of the sun wheel (11).

FIG. 8*a* shows the transfer gear-box's operation in the cross-country gear without a difference in the rotational speeds of the front axle and the rear axle. The hobbing of the two planet gear sets becomes apparent.

FIG. 8*b* shows transfer gear-box's operation in the cross-country gear, assuming an exemplary difference in the rotational speeds. The rotational speed of the sun wheels (1, 11) is changed by said difference.

Principally, the intermediate shaft (16) does not have to be included, and the spur gear (21) or the chain wheel (21*b*) may be coupled to the ring gear (12), optionally integrally.

The gearing data include the number of teeth, the pitch angles, the normal engagement angle, and the real pitch module, so that toothed gears having the same gearing data have the same effect and transfer the same moments and may principally be manufactured using the same gear-cutting tools.

Figure 10:
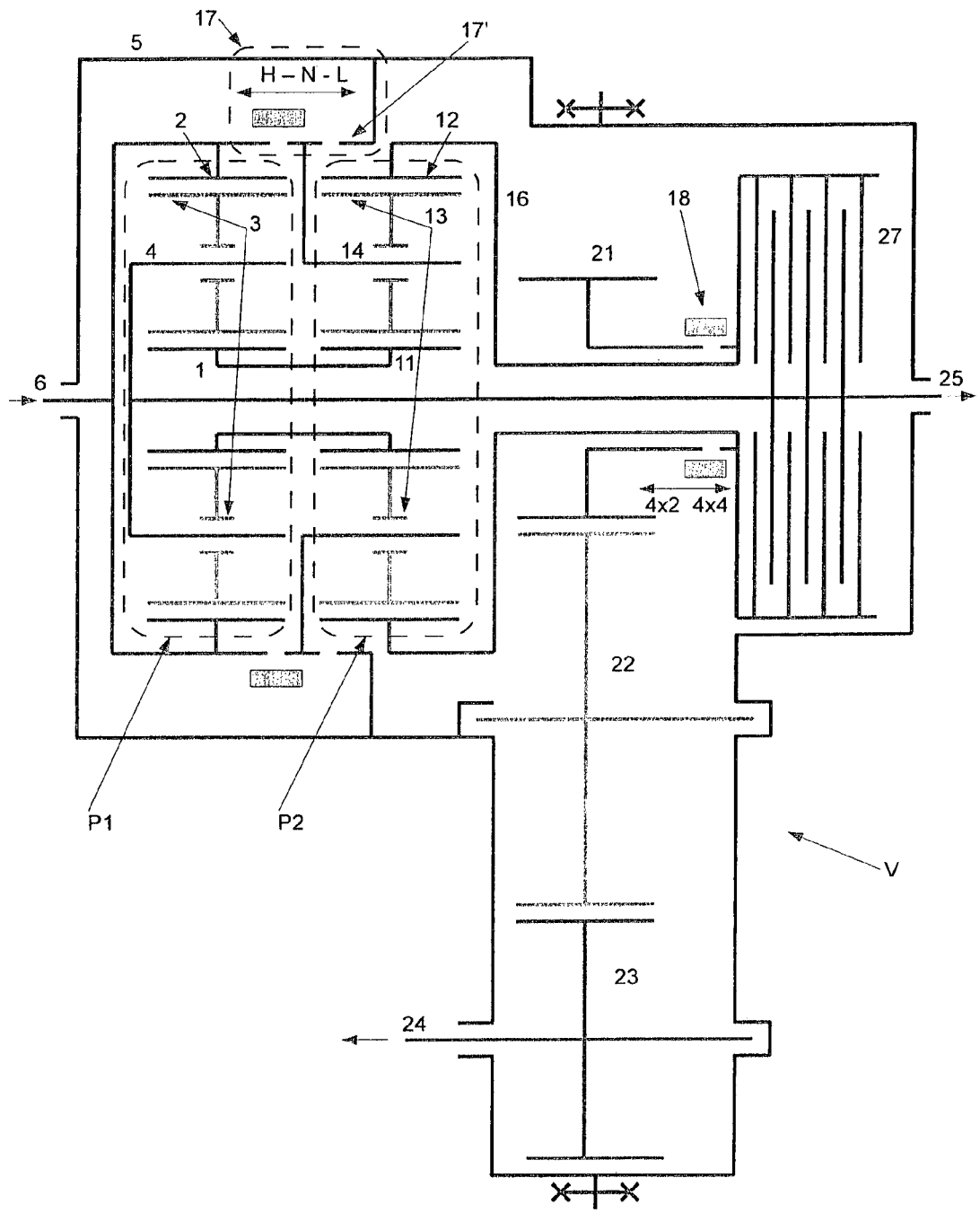
FIG. 10 illustrates the possibility of switching the all-wheel drive on or off.

FIG. 10 shows a transfer gear-box having a configuration according to FIG. 1. In this embodiment and all the other embodiments of the invention, it is possible to switch the all-wheel drive on and off. To this end, a coupling unit (18) is provided to which the driving wheel (21) may be coupled or via which the chain wheel (21*b*) may be coupled to the intermediate shaft (16). It is possible to provide an engaging and disengaging coupling or a shift collar (18) as said coupling, said shift collar being supported displaceably on the driving wheel (21) or the chain wheel (21*b*) and may be engaged with a coupling part of the intermediate shaft. If the all-wheel drive is switched off, the lock coupling (27) is actuated at the same time, in order to transfer the entire driving moment to the rear output shaft (25).

The invention claimed is:

1. A transfer gear-box, comprising:
a casing,
an input shaft,
a rear output shaft,
a front output shaft,
an offset gear set acting on the front output shaft,
a first planet gear set, and
a second planet gear set,
wherein the rear output shaft is co-axial with the input shaft,
wherein the front output shaft is offset in relation to the input shaft,
wherein the planet gear sets are co-axial with the input shaft,
wherein the first planet gear set is a first simple planet gear set consisting of a first ring gear, a first sun wheel, a first planet carrier, and a plurality of first planet wheels, wherein each of the first planet wheels is rotatably mounted to the first planet carrier,
wherein the second planet gear set is a second simple planet gear set consisting of a second ring gear, a second sun wheel, a second planet carrier, and a plurality of second planet wheels, wherein each of the second planet wheels is rotatably mounted to the second planet carrier,
wherein the input shaft is connected to the first ring gear,
wherein the rear output shaft is connected to the first planet carrier,
wherein the second ring gear is drivably connected to the offset gear set,
wherein the first sun wheel is connected to the second sun wheel,
and wherein the second planet carrier satisfies at least one requirement selected from the group consisting of:
the transfer gear box further comprises an interconnection, and the second planet carrier is coupled to the casing via the interconnection,
the transfer gear box further comprises the interconnection, and the second planet carrier is coupled to the first ring gear via the interconnection, and
the second planet carrier assumes a neutral position.

2. The transfer gear-box according to claim 1, wherein the offset gear set comprises a sprocket chain gear, comprising an upper chain wheel, a sprocket chain, and a lower chain wheel.

3. The transfer gear-box according to claim 1, wherein the offset gear set comprises a set of spur gears.

4. The transfer gear-box according to claim 1, further comprising a lock coupling, wherein the rear output shaft is coupled, via the lock coupling, to at least one member of the group consisting of: the intermediate shaft, the ring gear, the spur gear, and the chain wheel.

5. The transfer gear-box according to claim 1, wherein the lock coupling comprises a controllable friction clutch having different degrees of torque transmission.

6. The transfer gear-box according to claim 1, wherein the first sun wheel and the second sun wheel have identical gearing data.

7. The transfer gear-box according to claim 2, wherein:
the first planet gear set is located in front of the second planet gear set,
the upper chain wheel is located behind the second planet gear set,
the front side of the first planet carrier is connected to the rear output shaft,
the sun wheels are hollow bodies located on a larger diameter than the rear output shaft,
the intermediate shaft is a hollow shaft located on a larger diameter than the rear output shaft, and
the front side of the second planet carrier satisfies the at least one requirement selected from the group consisting of:
the transfer gear box further comprises the interconnection, and the front side of the second planet carrier is coupled to the casing via the interconnection,
the transfer gear box further comprises the interconnection, and the front side of the second planet carrier is coupled to the first ring gear via the interconnection, and
the front side of the second planet carrier assumes the neutral position.

8. The transfer gear-box according to claim 2, wherein:
the first planet gear set is located in front of the upper chain wheel,
the second planet gear set is located behind the upper chain wheel,
the front side of the first planet carrier is coupled to the rear output shaft,
the sun wheels are hollow bodies located on a larger diameter than the rear output shaft,
the front side of the first planet carrier is a hollow shaft located on a larger diameter than the sun wheels and extends towards the interconnection,
the intermediate shaft is a hollow shaft located on a larger diameter than the connection between the interconnection and the planet carrier, and
the front side of the second planet carrier satisfies the at least one requirement selected from the group consisting of:
the transfer gear box further comprises the interconnection, and the front side of the second planet carrier is coupled to the casing via the interconnection,
the transfer gear box further comprises the interconnection, and the front side of the second planet carrier is coupled to the first ring gear via the interconnection, and
the front side of the second planet carrier assumes the neutral position.

9. The transfer gear-box according to claim 2, wherein:
the upper chain wheel is located in front of the first planet gear set,
the second planet gear set is located behind the upper chain wheel,
the front side of the planet carrier is connected to the rear output shaft,
the sun wheels are hollow bodies located on a larger diameter than the rear output shaft,
the front side of the second planet carrier extends on a larger diameter via the first ring gear and the input shaft to the interconnection,
the intermediate shaft is a hollow shaft located on a larger diameter than the connection between the interconnection and the second planet carrier, and
the front side of the second planet carrier satisfies the at least one requirement selected from the group consisting of:
the transfer gear box further comprises the interconnection, and the front side of the second planet carrier is coupled to the casing via the interconnection,
the transfer gear box further comprises the interconnection, and the front side of the second planet carrier is coupled to the first ring gear via the interconnection, and
the front side of the second planet carrier assumes the neutral position.

10. The transfer gear-box according to claim 2, wherein:
the upper chain wheel is located in front of the second planet gear set,
the first planet gear set is located behind the second planet gear set,
the sun wheels are located on a larger diameter than the input shaft,
the connection between the front side of the planet carrier and the interconnection is a hollow shaft located on a larger diameter than the input shaft,
the intermediate shaft is a hollow shaft located on a larger diameter than the connection between the front side of the second planet carrier and the interconnection,
the front side of the first planet carrier is connected to the rear output shaft,
and the front side of the second planet carrier satisfies the at least one requirement selected from the group consisting of:

the transfer gear box further comprises the interconnection, and the front side of the second planet carrier is coupled to the casing via the interconnection, the transfer gear box further comprises the interconnection, and the front side of the second planet carrier is coupled to the first ring gear via the interconnection, and the front side of the second planet carrier assumes the or may assume a neutral position.

11. The transfer gear-box according to claim 2, wherein:

the second planet gear set is located in front of the upper chain wheel, the first planet gear set is located behind the upper chain wheel, the sun wheels are hollow bodies located on a larger diameter than the input shaft, the intermediate shaft is a hollow shaft located on a larger diameter than the input shaft and the sun wheels, the front side of the first planet carrier is connected to the rear output shaft, and the front side of the second planet carrier satisfies the at least one requirement selected from the group consisting of:

the transfer gear box further comprises the interconnection, and the front side of the second planet carrier is coupled to the casing via the interconnection, the transfer gear box further comprises the interconnection, and the front side of the second planet carrier is coupled to the first ring gear via the interconnection, and the front side of the second planet carrier assumes the neutral position.

12. The transfer gear-box according to claim 2, wherein:

the second planet gear set is located in front of the first planet gear set, the upper chain wheel is located behind the first planet gear set, the sun wheels are hollow bodies located on a larger diameter than the input shaft, the connection between the front side of the planet carrier and the rear output shaft is a hollow shaft located on a larger diameter than the ring gear, the front side of the first planet carrier is connected to the rear output shaft, and the front side of the second planet carrier satisfies the at least one requirement selected from the group consisting of:

the transfer gear box further comprises the interconnection, and the front side of the second planet carrier is coupled to the casing via the interconnection, the transfer gear box further comprises the interconnection, and the front side of the second planet carrier is coupled to the first ring gear via the interconnection, and the front side of the second planet carrier assumes the neutral position.

13. The transfer gear-box according to claim 1, wherein the interconnection comprises a translatable shift collar.

14. The transfer gear-box according to claim 2, further comprising a coupling unit configured to release the drive coupling between the intermediate shaft and the driving wheel.

15. The transfer gear box according to claim 1, further comprising an intermediate shaft, wherein the second ring gear is drivably connected to the offset gear set via the intermediate shaft.

16. The transfer gear box according to claim 1, wherein the first sun wheel and the second sun wheel are integrally formed.

17. The transfer gear box according to claim 1, wherein all of the first planet wheels are identical.

18. The transfer gear box according to claim 1, wherein the first ring gear and the second ring gear have identical gearing data.

19. The transfer gear box according to claim 1, wherein the first planet carrier and the second planet carrier are identical.

* * * * *